United States Patent [19]

Joyce

[11] 3,728,824
[45] Apr. 24, 1973

[54] AUXILIARY WORKPIECE SUPPORTING MEANS FOR PRECISION GRINDING MACHINES

[75] Inventor: Glover C. Joyce, Worcester, Mass.

[73] Assignee: The Warner & Swasey Company, Cleveland, Ohio

[22] Filed: Apr. 26, 1971

[21] Appl. No.: 137,481

[52] U.S. Cl. .............................. 51/105 SP, 51/237 CS
[51] Int. Cl. ................................................. B24b 5/42
[58] Field of Search ............................. 51/105, 237

[56] References Cited

UNITED STATES PATENTS

| 3,583,108 | 6/1971 | Oishi | 51/237 CS |
| 3,006,118 | 10/1961 | Fournier | 51/277 CS |
| 2,950,586 | 8/1960 | Smith | 51/237 CS |
| 3,034,268 | 5/1962 | Smith | 51/237 CS |
| 3,142,941 | 8/1964 | Fournier | 51/105 SP |

Primary Examiner—Harold D. Whitehead
Attorney—Thomas L. Tarolli and Calvin G. Covell

[57] ABSTRACT

In a precision grinding machine including mutually spaced workpiece supporting assemblies rotatable about a common axis and each incorporating a relatively fixed clamping jaw disposed to support one end of a workpiece during successive workpiece unloading and loading operations and a cooperating relatively movable clamping jaw selectively movable into and out of engagement with a workpiece supported in the cooperating relatively fixed clamping jaw; auxiliary work supporting means mounted upon each workpiece supporting assembly adjacent to its relatively fixed clamping jaw, operative, whenever the relatively movable clamping jaw is released, to support and remove a portion of the weight of the workpiece off the adjacent relatively fixed clamping jaw, including, means operative to facilitate axial and/or angular rotary movement of a workpiece engaged by the auxiliary supporting means for precise axial and/or angular positioning of the workpiece relative to the respective relatively fixed clamping jaws.

13 Claims, 8 Drawing Figures

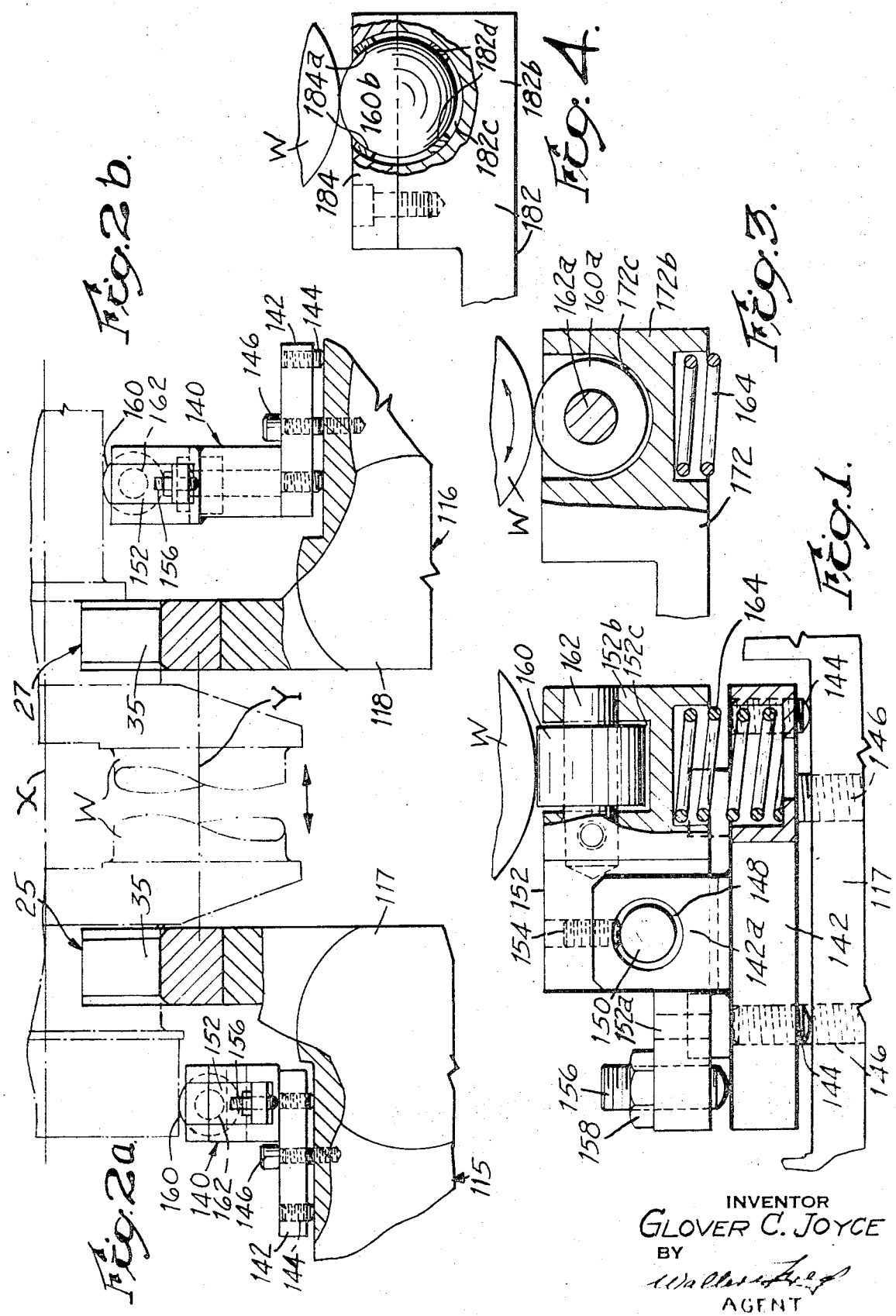

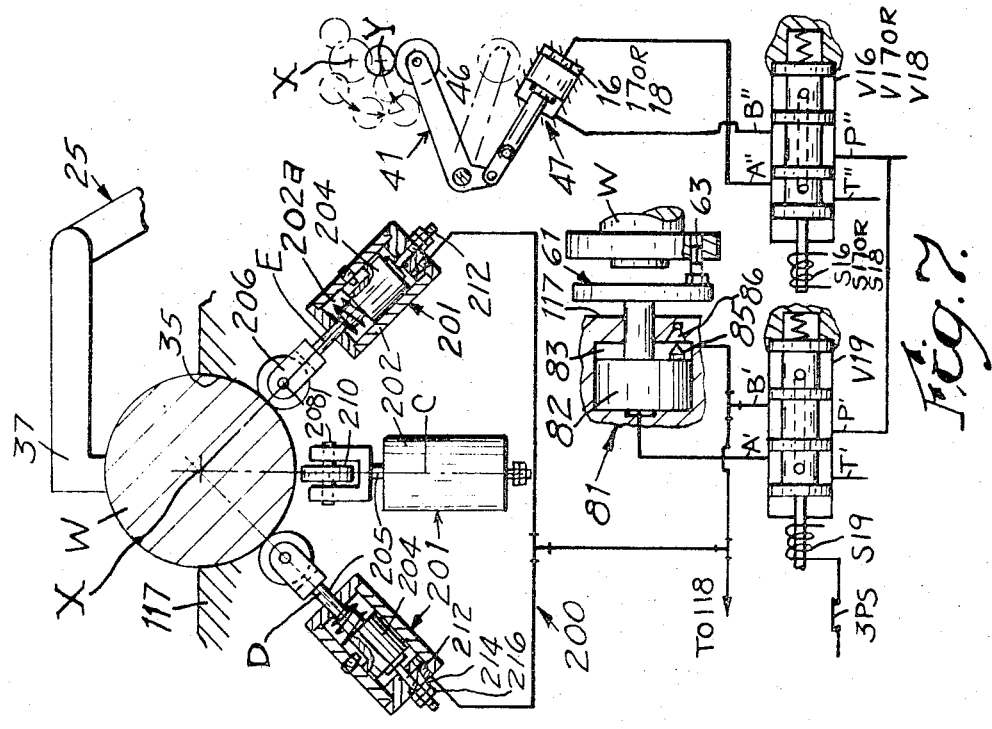
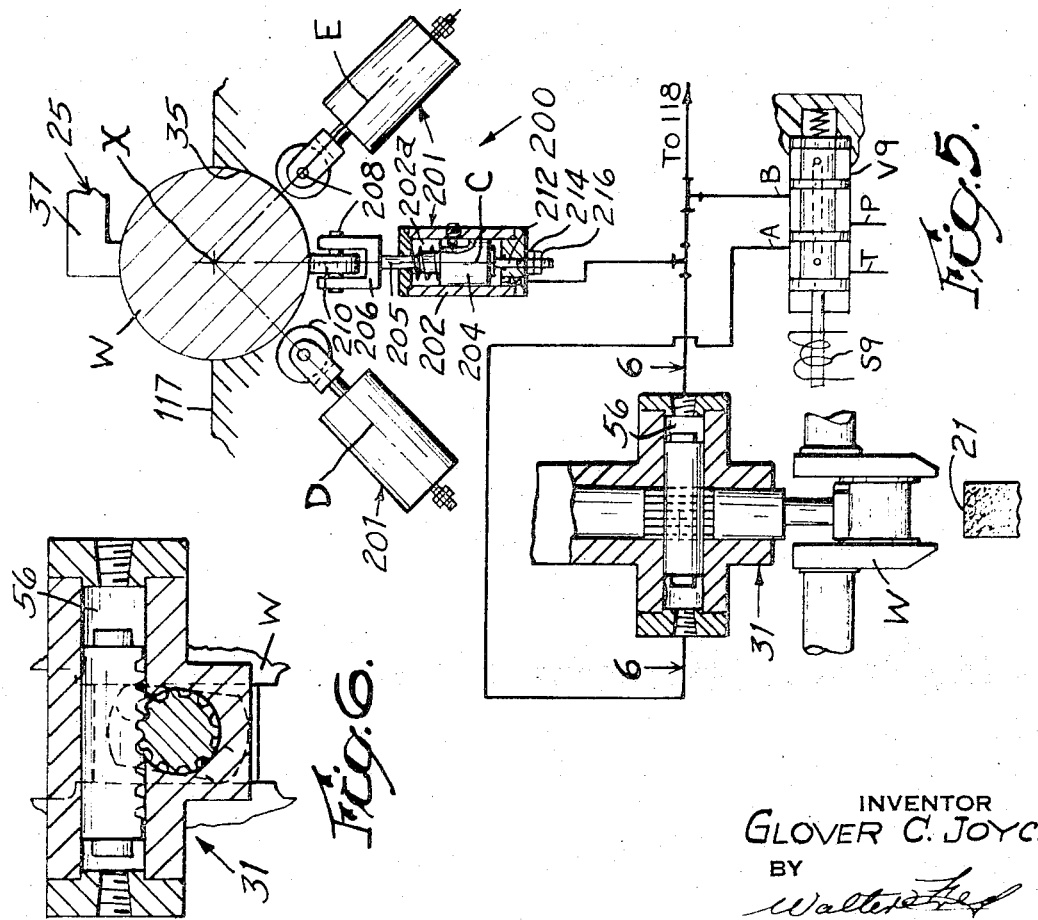

AUXILIARY WORKPIECE SUPPORTING MEANS FOR PRECISION GRINDING MACHINES

BACKGROUND OF THE INVENTION

1. Field of Invention

The instant invention contemplates auxiliary workpiece supporting means for relatively heavy workpieces required to be precisely located within and supported by a machine tool arranged to perform a machining operation thereon, and particularly for heavy workpieces required to be precisely positioned within and supported by a precision grinding machine arranged to perform one or more grinding operations thereon.

2. Description of the Prior Art

It is known to provide work rests between the centers of a pair of spaced work supports for the purpose of supporting and aligning a heavy workpiece prior to being engaged, picked up, and supported by the centers. However, the applicants auxiliary work support means differs from the prior art in that they have rotatable workpiece engaging members and are supported by and rotatable with the work supports for the purpose of reducing sliding friction by supporting a portion of weight of the workpiece during axial and/or angular displacements of a heavy workpiece relative to the frictionally engaging work supports. For example, a relatively heavy elongated workpiece such as a crankshaft deposited in a precision grinding machine for the purpose of grinding its main bearing or pin bearing surfaces, is supported in the grinding machine in the manner illustrated in U.S. Pat. No. 3,142,941 granted Aug. 4, 1964 to Fournier, for example, by means of a pair of opposed spaced workpiece supporting assemblies each provided with a pair of opposing clamps arranged to frictionally engage and fixedly secure one end portion of each crankshaft deposited in the crankpin grinding machine.

Typical grinding operations on such workpieces require precise axial and/or angular orientation relative to the grinding wheel before the respective ends of the workpiece are secured between the opposing clamps incorporated in each of the respective workpiece supporting assemblies.

SUMMARY OF THE INVENTION

Auxiliary work supports including low friction freely rotatable work engaging members mounted on levers or piston rods are mounted on axially spaced work supports rotatable about a common axis. There are either resilient and/or fluid actuated means for automatically biasing the auxiliary work supports into supporting engagement with portions of the workpiece adjacent precision work locating bearing surfaces on clamping jaws fixed to the work supports. Movable clamping jaws are operable in the well known manner to clamp the workpiece against the bearing surfaces of the fixed jaws after it has been displaced relative thereto to properly align portions of the workpiece with the cutting tool or grinding wheel of a machine tool. Upon releasing the movable clamping jaws the resilient or fluid actuated means applies a predetermined amount of force to move the auxiliary work supports sufficiently to support and remove a portion of the weight of the heavy workpiece from the bearing surfaces of the fixed clamping jaws. Thus the sliding frictional resistance between the workpiece and the bearing surfaces is substantially reduced by the freely rotatable work engaging members to allow subsequent easier axial and/or angular rotary displacements of the workpiece by axial and/or angular work positioning mechanisms on the machine tool.

Therefore, an object of this invention is to provide auxiliary supporting means for a workpiece, operative automatically to facilitate its precise displacement relative to workpiece supporting assemblies in which the workpiece is deposited.

Another object of this invention is to provide auxiliary supporting means for a workpiece operative automatically to facilitate axial displacement of the workpiece relative to workpiece supporting assemblies in which it is deposited.

Still another object of this invention is to provide auxiliary supporting means for a workpiece operative automatically to facilitate angular rotary movement of the workpiece relative to workpiece supporting assemblies in which it is deposited.

Yet another object of this invention is to provide auxiliary supporting means for a workpiece operative automatically to facilitate both axial and angular displacements of the workpiece relative to workpiece supporting assemblies in which it is deposited.

A further object of this invention is to provide first and second sets of auxiliary supporting means for a workpiece selectively operative, respectively, to facilitate axial movement of the workpiece relative to workpiece supporting assemblies in which it is deposited, and to facilitate angular rotary movement of the workpiece relative to workpiece supporting assemblies in which it is deposited.

BRIEF DESCRIPTION OF THE DRAWINGS

FIG. 1 shows an end view, partially in section, of an auxiliary work supporting means for a workpiece arranged to facilitate axial movement of the workpiece relative to a pair of workpiece supporting assemblies in which it is deposited;

FIGS. 2a and 2b show side elevations, partially broken away, of one suitable arrangement for mounting the respective auxiliary supporting means shown in FIG. 1 in the respective workpiece supporting assemblies of a machine tool, and illustrating the operative relationship between the respective auxiliary workpiece supporting means and portions of a typical elongated workpiece supported in the respective workpiece supporting assemblies;

FIG. 3 is a detailed view, partially broken away, of a portion of the instant invention illustrated in FIG. 1 and FIGS. 2a and 2b, modified to facilitate angular rotary rather than axial movement of the workpiece relative to the workpiece supporting assemblies in which it is deposited;

FIG. 4 is a detailed view, partially broken away, of a portion of the instant invention illustrated in FIG. 1 and FIGS. 2a and 2b, modified to facilitate both axial and angular movement of the workpiece relative to the workpiece supporting assemblies in which it is deposited;

FIG. 5 illustrates an alternative embodiment of the instant invention incorporating separate sets of auxiliary workpiece supporting means selectively operative to facilitate axial movement of the workpiece and to facilitate angular movement of the workpiece, and additionally illustrates actuating means for the auxiliary workpiece supporting means for facilitating axial movement of the workpiece operative concurrently with means for precisely locating the workpiece axially relative to the workpiece supporting assemblies in which it is deposited;

FIG. 6 is a section taken on line 6—6 of FIG. 5 further illustrating details of the means for precisely locating the workpiece axially; and FIG. 7 illustrates actuating means for the auxiliary workpiece supporting means for facilitating angular displacements of the workpiece operative concurrently with means to rotate a crankshaft to position different crankpins thereon successively in the proper position for a grinding operation thereon.

DESCRIPTION OF THE PREFERRED EMBODIMENTS

By example only, the invention will be described in combination with a machine tool such as crankpin grinding machine comprising a pair of rotatable work support assemblies for supportingly engaging opposite end portions of a crankshaft and on which the auxiliary work support means of the instant invention are mounted; means for rotating, angular indexing, and axially displacing the crankshaft relative to the work support assemblies to precisely align crankpins to be ground with the grinding wheel.

A typical crankpin grinding machine including the necessary means, with which the instant invention can be used in combination, and incorporated by reference is disclosed in the Fournier et al. U.S. Pat. No. 3,142,941 granted Aug. 4, 1964 and to which reference may be had for details not disclosed herein. The typical crankpin grinding machine referred to has a pair of spaced coaxial work support assemblies or pot chucks 117 and 118 rotatably mounted on a pair of work heads 115 and 116 and supporting a crankshaft W for rotation about an axis of a crankpin to be ground generally parallel to the cutting face and axis of the grinding wheel 21.

Since the respective crankpins of a crankshaft are angularly offset the crankshaft is rotated about its axis relative to the pot chuck assemblies after each crankpin is ground, in the manner and by the means disclosed, to bring the axis of the next crankpin to be ground into alignment with the common axis of rotation of the pot chucks. In most instances each crankpin is also displaced axially relative to the pot chucks into alignment with the grinding wheel 21 by the endwise locator 31 to provide what is known as a spark splitting operation in the disclosed manner.

The crankshaft W is located and supported by the pot chucks when the front and rear main bearings thereof are in frictional engagement with the bearing surface of the half bearing 35 which also serve as the fixed clamping jaws of the clamping assemblies 25 and 27 on the pot chucks 117 and 118. Each of the clamping assemblies 25 and 27 includes the fixed jaw or half bearing 35 and a releasable movable clamping jaw 37 coacting with the fixed jaw or half bearing 35 to secure a workpiece in the pot chucks 117 and 118 for rotation therewith.

The instant invention provides auxiliary work support means 140 adapted to be mounted on each of the pot chucks 117 and 118 for the purpose of substantially reducing sliding friction by removing a portion of weight of the workpiece off the surfaces of the half bearings 35 when a relatively heavy workpiece W must be axially and/or angularly displaced relative to work supporting assemblies or pot chucks 117 and 118.

Each of the auxiliary work supports 140 comprises an adjustable base or base plate 142 adapted to be fixed in any suitable manner, as by bolting, to a portion of the pot chucks 117 and 118 adjacent the half bearings 35. A plurality of adjusting screws 144 are threaded into threaded holes in the plate 12 and extend into engagement with the pot chuck. By adjusting the screws 144 the base plate can be raised or lowered relative to the pot chucks and thereafter fixed thereto in the adjusted position by one or more bolts 146.

On and extending away from the base plate 142 is a U-shaped bearing support portion or block 142a having spaced parallel portions with holes in which are preferably fixed a pair of spaced axially aligned sleeve bearings or bushings 148 which may also be a pair of needle or ball bearings. A pivot pin 150 extends between and into the spaced bearings 148 with its axis substantially parallel to the axis of rotation of the pot chucks 117 and 118 and the workpiece W.

Pivotally mounted in the U-shaped block 142a and about the pivot pin 150 is a lever or pivotal member 152 having intermediate its opposite ends a hole through which the pivot pin 150 extends and suitably fixed to the lever by a set screw 154. The pivotal member or lever 152 has a stop arm portion 152a on one side of the axis of the pivot pin 150 and in which an adjustable stop screw 156 is threaded and locked in adjusted position by a lock nut 158. On the opposite side of the axis of the pivot pin 150 the lever 152 has a support arm or head portion 152b with a cavity, slot or pocket 152c therein suitable for accommodating a freely rotatable low friction workpiece engaging member 160 of the desired type and size.

In FIGS. 1 to 3 inclusive the cavity, slot or pocket 152c is of a shape and size to accommodate a roller 160 which may be the outer race of an anti-friction roller or ball bearing assembly, or as shown a plain roller rotatably mounted on a bearing shaft or journal 162 fixed to the support arm 152b by a set screw. The roller 160 is positioned to rotate freely about the axis of the shaft 162 extending transversely and substantially at right angles to the pivot axis of the pivot pin 150 and the direction in which the workpiece is displaced relative to the work support means 117 and 118.

Resilient means of any suitable type, such as, the spring 164 shown located between the base plate 142 and the lever 152 can be provided to bias the support arm portion 152b together with the low or anti-friction work engaging member 160 away from the base plate 142 and the stop arm portion together with the stop screw 156 toward the base plate 142. The opposite ends of the spring 164 extend into recesses and are seated against the opposing recessed surfaces in the support arm portion 152b and the base plate 142. The spring 164 is of any commercially available type of sufficient predetermined size and capacity to exert a predetermined amount of force, when compressed, to at least support a portion of the weight of the workpiece W and reduce the degree of frictional engagement between the workpiece and the bearing 35.

It can be seen that when the movable clamping jaw 37 releases the workpiece W, the force exerted by the spring 164 will also overcome any cohesiveness causing the workpiece W to stick to the half bearings 35. By adjusting the stop screw 156 the portion of weight of the workpiece taken off the half bearing 35 and the degree of frictional resistance between the half bearing 35 and the surface of the workpiece W can be varied. For example the bearing surfaces of crankshaft W shown in phantom lines in FIGS. 2a and 2b could be, but are preferably not, completely disengaged from the surfaces of the half bearings 35. Thus the crankshaft would be more easily displaced relative to pot chucks since there would be substantially less frictional sliding resistance and only two points of rolling contact between the rotatable work engaging members 160 and the circular main bearing surfaces of the crankshaft W.

In FIG. 3 there is shown a modified form of the invention wherein a lever 172 can be substituted for the lever 152 to facilitate easier rotary and angular displacements of the workpiece on freely rotatable work engaging members. The lever 172 is substantially the same as but differs from the lever 152 in that it has a support arm portion 172b with a cavity, slot, or pocket 172c and a work engaging member 160a arranged to rotate freely about the axis of a bearing shaft or journal 162a that extends parallel to the pivot axis of the pivot shaft 150 and at a right angle to the direction of movement of the workpiece W being displaced relative thereto, indicated by the arrow.

Another modification of the invention shown in FIG. 4 provides another lever 182 that may be substituted for both the levers 152 and 172. The lever 182 has a support arm portion 182b which differs from that of levers 152 and 172 in that it has a semicircular or generally hemispherical cavity, socket or pocket 182c and a pair of angularly spaced narrow low friction bearing shoes or pads 182d therein fixed to the support arm portion 182b.

Engaging, supported, and freely rotatable on the bearing pads 182d is a spherical work engaging member or ball bearing 160b that protrudes out of the cavity. Retaining means such as the retaining cap or plate 184 is fixed as by bolting to the support arm 182b and has an opening of a partial semi-circular or hemispherical shape through which the other half of the spherical work engaging member or ball bearing 160b protrudes. A pair of angularly spaced retaining low friction bearing pads or shoes 184a are fixed within the opening to the retaining cap 184 to maintain the ball bearing 160b in place.

The spherical work engaging member 160b is confined by the low friction bearing pads and free to rotate in any direction within them. Therefore the heavy workpiece W engaged and supported thereby can be easily displaced both axially and angularly about its axis with two points of rolling frictional engagement between it and the balls 160b rotated thereby.

In FIGS. 5, 6, and 7 there is shown still another embodiment of the invention wherein auxiliary work support means 200 comprising at least one piston and cylinder device 201 mounted on each pot chuck 117 and 118, are provided and adapted to be connected into and actuated by the fluid pressure control system of a machine tool, such as disclosed in U.S. Pat. No. 3,142,941 referred to above as an example.

Each piston and cylinder device 201 comprises a cylinder 202 with a cylinder bore 202a therein. Each cylinder 202 can be either a separate unit suitably attached to or constructed as an integral part of the pot chucks 117 and 118. This being a matter of preference and design not shown and deemed to be unnecessary to a clear understanding of the invention by those of ordinary skill in the art. A piston or plunger 204 is slideably mounted in the cylinder bore 202a and has a piston rod 205 extending from the piston or plunger 204 and through one end portion or end cap fixed to the cylinder 202. Fixed to the end of the piston rod is a U-shaped holder, block or clevis 206 which is only one example of the many possible means which may be provided for supporting a bearing shaft 208, and a low friction freely rotatable workpiece engaging member or roller 210 thereon. At the opposite end of the cylinder is an end cap fixed to the cylinder and a suitable passage or threaded hole connected in the conventional manner to a line, pipe or conduit for conveying fluid under pressure from a suitable fluid pressure system.

Stop means are provided for limiting the stroke of the piston and hence the portion of weight of the workpiece supported by the auxiliary support means 200. The stop means may comprise a predetermined fixed stroke of the piston relative to the cylinder wherein a shoulder on either the piston or piston rod 205 butts against the end of the cylinder 202. Preferably the stop means is adjustable and comprises a rod 212 extending from the opposite end of the piston 204 and the opposite end of the cylinder 202. The rod 212 is slideable in the end of the cylinder and sealed in the conventional manner, not shown, to prevent fluid from escaping thereby and has a threaded end portion on which are threaded a stop nut 214 and a lock nut 216.

The stop nut 214 engages the cylinder to limit the stroke of piston 204 and can be adjusted to vary the stroke and hence the portion of weight of the workpiece supported by each of piston and cylinder devices 201 and the auxiliary support means 200.

As shown, there are three fluid actuated piston and cylinder devices 201 on the auxiliary workpiece support means 200 associated and cooperating with each of the work support assemblies 117 and 118 for a total of six devices 201 on the machine. One of a pair or first set of piston and cylinder devices 201 of the auxiliary workpiece support means 200 is arranged on each of the pot chucks 117 and 118 substantially in a plane C and to facilitate an axial displacement of the workpiece W and rotation of roller 210 about an axis of the bearing shaft 208 situated at substantially a right angle to the direction of axial displacement and the axis X of rotation of the workpiece W relative to the pot chucks 117 and 118.

Another pair of two pairs or second sets of piston and cylinder devices 201 of the auxiliary work support means 200 are mounted in planes D and E on opposite sides of plane C and the first set of devices 201. They are arranged to engage the workpiece W at substantially equal angular distances from the plane C passing through the axis X of the workpiece and the point of contact of the roller 210 of the first set of auxiliary support means 200. Rotary angular displacements of the workpiece are facilitated by the two pairs or second sets of devices 201 of the auxiliary work support means 200 since each of the work engaging members or roller 210 is positioned for rotation about the axis of the bearing shaft 208 substantially parallel to the axis X and right angles to the direction of displacement of the workpiece.

Referring to FIG. 5, there is shown how connecting conduits and the first set of piston and cylinder devices 201 of the auxiliary work support means 200 can be tied in or connected with the fluid pressure system, the cylinder 56 of the endwise locator, steadyrest, and gage assembly 31, and port B of the directional control valve V9 disclosed in the above mentioned U.S. Pat. No. 3,142,941 to facilitate axial displacements of the crankshaft W.

In operation, after a crankshaft W is deposited in the pot chucks 117 and 118 and engaged by the locating pin 63 of the angular positioning mechanism 61 or rotated by the angular indexing mechanism, a crankpin to be ground is positioned between the grinding wheel 21 and the endwise locator assembly 31. Thereafter, the fluid directional control valve V9 is actuated by the energization of solenoid S9 actuating valve V9 whereby fluid under pressure in line P passes to a port, line, or conduit B to both the cylinders 56 and 202 of the pair or first set of fluid actuated piston and cylinders 201. As a result a predetermined portion of the weight of the workpiece W is supported and engaged by only the first set of devices 201 of the auxiliary support means 200 during the simultaneous axial movement of the workpiece W by the endwise locator 31 in the manner disclosed in the U.S. Pat. No. 3,142,941 referred to. Upon de-energization of solenoid S9 valve V9 resets and fluid under pressure in line P passes to port, line or conduit A to cylinder 56 to reset the endwise locator 31 and fluid exhausts from the cylinders 202 of the first set of devices 201 through line B to port, line or conduit T. The total weight of the crankshaft or workpiece W is then supported by the half bearings 35 having a substantial amount of area of frictional engagement with the workpiece W for the purpose of aligning and clamping the workpiece against movement during grinding thereof.

FIG. 7 discloses one method of connecting conduits and the two pairs or the second set of fluid actuated piston and cylinder devices of the auxiliary work support means 200 situated on planes D and E of each of the pot chucks 117 and 118 to port A' of control valve V19 of the fluid pressure control system disclosed in U.S. Pat. No. 3,142,941.

Prior to depositing a crankshaft W in the pot chucks 117 and 118 and before each rotary displacement of the crankshaft W by the angular index mechanism the valve V19 is actuated as shown by energization of a solenoid S19. Shifting of valve V19 causes fluid under pressure in port, line or conduit P' to pass into port, line or conduit B' and simultaneously to both the clutch assembly 81 and each pair of the second set of the devices 201 situated in planes D and E on the pot chucks 117 and 118.

Only one of the first set and two of the second sets of piston and cylinder devices 201 of the fluid actuated auxiliary work support means 200 and one of the pot chucks 117 and 118 has been shown since the other is substantially a duplication thereof connected to the fluid conduits A and A' by conduits or lines as indicated by the legend "To 118". Fluid under pressure in conduit B' forces the piston 82 of the clutch assembly 81 toward the left as shown to disengage the locating pin 85 from the pot chuck 117 and allow rotation of the crankshaft W together with the piston 82 and locating pin 85 relative to the pot chucks 117 and 118 and shifts the pistons 204 and rollers 210 of the two pairs of the second sets of devices 201 of the auxiliary work support means 200 for supporting engagement with the workpiece W. As taught, one of the control valves V16, V17 or V18, only one of which is shown, is actuated substantially at the same time as the valve V19 by the energization of one of the respective solenoids S16, S17 or S18. Fluid under pressure then passes from port, line or conduit P" through port, line or conduit B" to one of the cylinders 16, 17 or 18 of the particular individual actuating means 47 connected thereto and moves the camming roller 46 of the respective camming element assembly 41 into engagement with the proper crankpin of the rotating crankshaft W previously released by the movable clamping jaws 37 in the manner taught in U.S. Pat. No. 3,142,941. Fluid exhausts from the opposite sides of the cylinders 16, 17 or 18 and 83 through the respective ports, lines or conduits A" and A' through control valves V19, and V16, V17 or V18 to exhaust ports, lines or conduits T" and T'.

Upon completion of the angular indexing and displacement of the crankshaft or workpiece W, solenoids S19 and S16, S17 or S18 are de-energized and valves V19, and V16, V17 or V18 reset. Fluid under pressure passes from ports P' and P" to ports or conduits A' and A" to opposite sides of cylinders 83 and 16, 17 or 18 moving the piston 82, the locating pin 85 into the locating hole 86, the drive pin 63 further into the flange of the crankshaft W and retracting the individual actuating means 47 with the camming element 46 out of the rotating path of the crankshaft W.

Fluid exhausts from ports A' and A" to ports T' and T". The weight of the workpiece W is now fully supported by the half bearings 35, the rollers 210 move slightly away from the workpiece W, and the pistons are reset in the cylinders 202 as a result of the fluid exhausting therefrom and the absence of pressure therein.

Shortly after completing the rotary angular indexing operation and before the workpiece is fully clamped against movement solenoid S9 is energized actuating control valve V9, the endwise locator 31, and the first pair or set of devices 201 of the auxiliary work support means 200 for axially displacing the crankshaft or workpiece W relative to the pot chucks 117 and 118 and the grinding wheel 21.

As disclosed in U.S. Pat. No. 3,142,941 the axial displacement of the crankshaft takes place when the lever 58 on assembly 31 contacts the newly angularly indexed crankpin to be ground and actuates a limit switch 9LS energizing time delay relay 4TR which energizes time delay relay 5TR energizing S9 of valve V9 for a period of time sufficient to axially displace the crankshaft W. Thereafter 5TR times de-energizing S5 which initiates the movement of the clamping jaws 37 to clamp the workpiece W securely against the half bearing 35 and the de-energization of S9 of valve V9 to retract the endwise locator and the first pair or set of devices 201 of the auxiliary work support means 200 before the crankpin is ground.

Preferably the movement of and force applied by the auxiliary work supports is predetermined and incorporated in their design, to help support a portion of the weight of the workpiece W. Thus the sliding friction created between the half bearing 35 and substantially heavy workpiece is reduced and converted to rolling friction allowing displacements thereof to be accomplished with much less effort and energy by rolling frictional contact with the auxiliary work support means.

Since many variations may be made of the invention without departing from the spirit thereof it is to be understood that the embodiments illustrated and disclosed hereinabove are not to be considered in a limiting sense and includes all modifications thereof contemplated within the scope of the appended claims.

What is claimed is:

1. In combination with a machine tool of the type having work support means, including clamping means that frictionally engage a portion of a workpiece, for aligning and clamping the workpiece placed therein against relative movement and releasable for allowing the workpiece to be displaced relative to the work support means and positioning the workpiece for engagement with a cutting tool, and means for displacing the workpiece relative to the work support means and positioning the workpiece for engagement with a cutting tool, wherein the improvement comprises:

auxiliary work support means on the work support means, operable when the workpiece is released by the clamping means, for supporting and removing a portion of weight of the workpiece off the clamping means, and providing rolling engagement with the workpiece to facilitate precise displacements of the workpiece by the displacing means, said auxiliary work support means comprising:

at least one piston and cylinder device mounted adjacent each of the clamping means and having a cylinder fixed adjacent each of the clamping means on the work support means and each cylinder having a cylinder bore therein;

a piston slidable in the cylinder bore;

a piston rod extending from the piston, out an end of the cylinder, and toward the workpiece in the work support means;

a rotatable workpiece engaging member mounted for rotation about its axis on an end portion of the piston rod;

biasing means, for moving the piston, together with the piston rod relative to the cylinder and forcing the rotatable workpiece engaging member into supporting engagement with the workpiece;

stop means, for limiting the relative movement between the piston and cylinder and the portion of weight of the work-piece supported by the auxiliary work support means;

a pair of piston and cylinder devices angularly spaced about the portion of the workpiece adjacent each of the clamping means with the piston rods and their axes converging toward each other and operable to simultaneously direct the rotatable workpiece engaging members thereon into supporting rolling engagement with different angularly spaced areas on the portion of the workpiece adjacent each of the clamping means during a rotary displacement of the workpiece relative to the work support means.

2. In combination with a machine tool for working on a crankshaft and of the type having work support means, including clamping means that frictionally engage the crankshaft, for aligning and clamping a crankshaft placed therein against relative movement and releasable for allowing the crankshaft to be displaced relative to the work support means and positioning the crankshaft for engagement with a cutting tool, and means for displacing the crankshaft relative to the work support means and positioning the crankshaft for engagement with a cutting tool, wherein the improvement comprises:

auxiliary work support means disposed on the work support means outwardly of the clamping means, operable when the crankshaft is released by the clamping means, for supporting and removing a portion of weight of the crankshaft off the clamping means, and providing rolling engagement with the crankshaft to facilitate precise displacements of the crankshaft by the displacing means, said auxiliary work support means comprising a rotatable workpiece engaging member having a circular outer surface disposed in engagement with a cylindrical outer surface of the crank-shaft outwardly of the clamping means; and mounting means for enabling said rotatable workpiece engaging member to roll along the cylindrical outer surface of the crankshaft upon movement of the crankshaft relative to the work support means.

3. The combination according to claim 2 wherein the auxiliary work support means further comprises:

a lever pivotally mounted outwardly of the clamping means on the support means, for movement about a pivot axis, and having an end portion movable about the pivot axis toward and away from the cylindrical outer surface of the crankshaft;

the rotatable workpiece engaging member and mounting means being disposed on the end portion of the lever for rotation about its axis; and biasing means, engaging the lever, for forcing the rotatable work engaging member into supporting engagement with the cylindrical outer surface of the crankshaft.

4. The combination according to claim 3 wherein the auxiliary support means further comprises:

stop means for limiting pivotal movement of the lever, the end portion, and the rotatable workpiece engaging member about the pivot axis away from the work support means and the portion of weight of the crankshaft supported by the auxiliary work support means.

5. The combination according to claim 4 wherein the stop means comprises:

adjustable means, attached to the lever, for varying the pivotal movement of the lever and the portion of the weight of the crankshaft supported by the auxiliary work support means.

6. The combination according to claim 5 wherein the auxiliary support means further comprises:
   a base plate fixed adjacent the clamping means on the work support means;
   a pivot support extending from the base plate and having
      a pivot hole about the pivot axis; and
   a pivot pin in the pivot hole and on which the lever is mounted for pivotal movement.

7. The combination according to claim 2 wherein the rotatable workpiece engaging member is a roller rotatable, by the cylindrical outer surface of the crankshaft about an axis of rotation at substantially a right angle to a direction of movement in which the crankshaft is displaced.

8. The combination according to claim 2 wherein this mounting means comprises:
   surface means defining a socket; and
   the rotatable work engaging member is a sphere rotatable in any direction within the socket and having a portion thereof protruding out of the socket for rolling engagement with the cylindrical surface of the crankshaft.

9. The combination according to claim 2 wherein the auxiliary work support means comprises:
   at least one piston and cylinder device mounted outwardly of each of the clamping means and having
      a cylinder fixed adjacent each of the clamping means on the work support means and each cylinder having
         a cylinder bore therein having a central axis extending transversely to a central axis of the cylindrical outer surface of the crankshaft;
      a piston slidable in the cylinder bore;
      a piston rod extending from the piston, out an end of the cylinder, and toward the crankshaft in the work support means;
      the rotatable workpiece engaging member being supported by said mounting means for rotation about its axis on an end portion of the piston rod;
   biasing means, for moving the piston, together with the piston rod relative to the cylinder and forcing the rotatable workpiece engaging member into supporting engagement with the cylindrical outer surface of the crankshaft; and
   top means, for limiting the relative movement between the piston and cylinder and the portion of the crankshaft supported by the auxiliary work support means.

10. The combination according to claim 1 wherein the auxiliary work support means comprises:
    three of the piston and cylinder devices arranged with at least one piston and cylinder device fixed between the pair of angularly spaced piston and cylinder devices adjacent the clamping means with its piston rod axis at substantially equal angles from the axes of the pair of the piston rods and operable to direct and force the rotatable workpiece engaging member thereon into supporting rolling engagement with another area of the portion of the workpiece adjacent the clamping means during an axial displacement of the workpiece relative to the work support means.

11. The combination according to claim 10 wherein the stop means comprises
    adjustable means, for varying the movement of the piston relative to the cylinder and the portion of weight of the workpiece supported by the auxiliary work support means.

12. The combination according to claim 11 wherein the biasing means comprises
    a source of fluid under pressure conveyed into the cylinder bore and applied against the piston during displacements of the workpiece by the displacing means.

13. The combination according to claim 12 wherein the rotatable workpiece engaging member is
    a roller rotatable by the workpiece about an axis of rotation situated at substantially a right angle to a direction of movement of the workpiece being displaced.

* * * * *